(12) United States Patent
Olsen et al.

(10) Patent No.: US 8,249,556 B2
(45) Date of Patent: *Aug. 21, 2012

(54) SECURING A MOBILE COMPUTING DEVICE (75) Inventors: Eric K. Olsen, San Jose, CA (US); Nicholas Julian Pelly, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/835,576

(22) Filed: Jul. 13, 2010

(65) Prior Publication Data

US 2012/0015629 A1    Jan. 19, 2012

(51) Int. Cl.
H04M 1/66 (2006.01)
H04M 1/00 (2006.01)
H04W 4/00 (2009.01)

(52) U.S. Cl. .................. 455/411; 455/456.1; 455/556.1
(58) Field of Classification Search .................. 455/411, 455/456.1, 556.1
See application file for complete search history.

(56) References Cited

U.S. PATENT DOCUMENTS

| 7,257,374 | B1 * | 8/2007 | Creigh | 455/41.2 |
|---|---|---|---|---|
| 2003/0184431 | A1 | 10/2003 | Lundkvist | |
| 2004/0178907 | A1 | 9/2004 | Cordoba | |
| 2004/0203895 | A1 * | 10/2004 | Balasuriya | 455/456.1 |
| 2004/0215816 | A1 | 10/2004 | Hayes et al. | |
| 2004/0257209 | A1 | 12/2004 | Yang | |
| 2005/0151623 | A1 * | 7/2005 | von Hoffmann | 340/5.61 |
| 2007/0226778 | A1 * | 9/2007 | Pietruszka | 726/2 |
| 2009/0318117 | A1 * | 12/2009 | Bocking et al. | 455/411 |
| 2010/0178873 | A1 * | 7/2010 | Lee et al. | 455/41.3 |
| 2012/0021724 | A1 | 1/2012 | Olsen et al. | |

FOREIGN PATENT DOCUMENTS

| EP | 1613040 A1 | 1/2006 |
|---|---|---|
| EP | 1635549 A2 | 3/2006 |
| WO | 2010051455 A2 | 5/2010 |

OTHER PUBLICATIONS

Cathal Mc Daid, Bluetooth Security—Part 1, Cathal's Corner, Feb. 2001, 6 pp., http://www.palowireless.com/bluearticles/cc1_security1.asp.

Thomas G. Xydis Phd, Simon Blake-Wilson, Security Comparison: BluetoothTM Communications vs. 802.11, revised Feb. 1, 2002, 7 pp.

(Continued)

Primary Examiner — Jean Gelin
Assistant Examiner — Michael Mapa
(74) Attorney, Agent, or Firm — Shumaker & Sierffert, P.A.

(57) ABSTRACT

In general, this disclosure describes techniques for unlocking certain functionality of a mobile computing device upon wirelessly detecting that an external device is in relatively close proximity to the mobile computing device. One example method comprises: providing a phone application and a second, different application; initiating a first mode of operation when the mobile computing device becomes locked; prohibiting user access to the second application during the first mode of operation when the mobile computing device fails to wirelessly detect a presence of an external device; and initiating a second mode of operation when the mobile computing device wirelessly detects the presence of the external device and when the mobile computing device has received user input specifying an access password, wherein the mobile computing device allows complete user access to both the phone application and the second application during the second mode of operation.

20 Claims, 5 Drawing Sheets

OTHER PUBLICATIONS

BlueProximity Manual, updated Nov. 9, 2007, 7 pp., http://blueproximity.sourceforge.net/manual.html.

Bluetooth PC LockItNow, New version 2.0 released with support for all Bluetooth PC solutions, accessed Mar. 9, 2010, 3 pp., http://www.blueshareware.com/lockitnow.asp.

Core System Architecture, accessed Mar. 12, 2010, 4 pp., http://www.bluetooth.com/English/Technology/Works/Pages/Core_System_Architecture.aspx#2.

International Search Report and Written Opinion of International Application No. PCT/US2011/043715, dated Oct. 28, 2011, 12 pp.

Office Action from U.S. Appl. No. 13/249,639, dated Nov. 23, 2011, 32 pp.

Response to Office Action dated Nov. 23, 2011, from U.S. Appl. No. 13/249,639, filed Feb. 23, 2012, 14 pp.

Notice of Allowance from U.S. Appl. No. 13/249,639, dated Apr. 24, 2012, 14 pp.

* cited by examiner

SECURING A MOBILE COMPUTING DEVICE

TECHNICAL FIELD

This disclosure relates to data processing on a mobile computing device.

BACKGROUND

Current mobile computing devices typically provide an unlock screen or user interface that receives manual user input to unlock the devices. For example, a user may enter a password or manually trace a graphical pattern on a touchscreen of a mobile computing device to unlock that device. In some instances, when a mobile computing device comprises a phone (e.g., a cellular telephone), the device may allow a user to receive incoming and/or make selective (e.g., emergency) outgoing calls even when the device is locked. Locking a mobile computing device may often restrict unauthorized individuals from accessing functionality and/or content provided by the device. Only individuals with access to a password may be able to unlock a locked device.

SUMMARY

In general, this disclosure describes techniques for unlocking certain functionality of a mobile computing device upon wirelessly detecting that an external device is in relative close proximity to the mobile computing device. For example, the external device may comprise a small device (e.g., fob) that could be carried by a user or that may be attachable to the user's keychain. The small device and mobile computing device may communicate wirelessly, such as via the Bluetooth® communication protocol. The mobile computing device may perform an automatic unlock operation responsive to detecting the presence of the small device.

According to one or more aspects of the disclosure, a computer-readable storage medium comprises instructions that, when executed, cause one or more processors of a mobile computing device to: provide a phone application and a second, different application on the mobile computing device, wherein the phone application is executable to process phone calls using the mobile computing device, and wherein the second application is executable to perform one or more tasks not related to processing phone calls using the mobile computing device; initiate a first mode of operation when the mobile computing device becomes locked; prohibit user access to the second application during the first mode of operation when the mobile computing device fails to wirelessly detect a presence of an external device; and initiate a second mode of operation when the mobile computing device wirelessly detects the presence of the external device and when the mobile computing device has received user input specifying an access password, wherein the mobile computing device allows complete user access to both the phone application and the second application during the second mode of operation.

According to one or more aspects of the disclosure, a method comprises: providing, by a mobile computing device, a phone application and a second, different application, wherein the phone application is executable to process phone calls using the mobile computing device, and wherein the second application is executable to perform one or more tasks not related to processing phone calls using the mobile computing device; initiating, by the mobile computing device, a first mode of operation when the mobile computing device becomes locked; prohibiting, by the mobile computing device, user access to the second application during the first mode of operation when the mobile computing device fails to wirelessly detect a presence of an external device; and initiating, by the mobile computing device, a second mode of operation when the mobile computing device wirelessly detects the presence of the external device and when the mobile computing device has received user input specifying an access password, wherein the mobile computing device allows complete user access to both the phone application and the second application during the second mode of operation.

According to one or more aspects of the disclosure, a mobile computing device comprises: one or more processors; a phone application operable by the one or more processors to process phone calls using the mobile computing device; a second, different application operable by the one or more processors to perform one or more tasks not related to processing phone calls using the mobile computing device; an operation mode module operable by the one or more processors to initiate a first mode of operation when the mobile computing device becomes locked; and means for prohibiting user access to the second application during the first mode of operation when the mobile computing device fails to wirelessly detect a presence of an external device. The operation mode module is operable to initiate a second mode of operation when the mobile computing device wirelessly detects the presence of the external device and when the mobile computing device has received user input specifying an access password. The mobile computing device further comprises means for allowing complete user access to both the phone application and the second application during the second mode of operation.

Certain aspects of the disclosure may provide one or more benefits. For example, a mobile device may provide additional security for data content that is stored in the mobile device by providing an unlock mechanism that does not provide access to such content unless the mobile device is capable of wirelessly detecting the presence of a separate, external (e.g., mobile) device. Thus, if, for example, a first user loses or misplaces the first user's mobile device, which may include private or other sensitive information (e.g., email messages, photos, other sensitive data), and the mobile device is locked, a second user may not be able to unlock the mobile device or gain access to the sensitive information contained therein unless the second user also has access to a completely separate device that is external to the mobile device, and whose presence can be wirelessly detected by the mobile device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
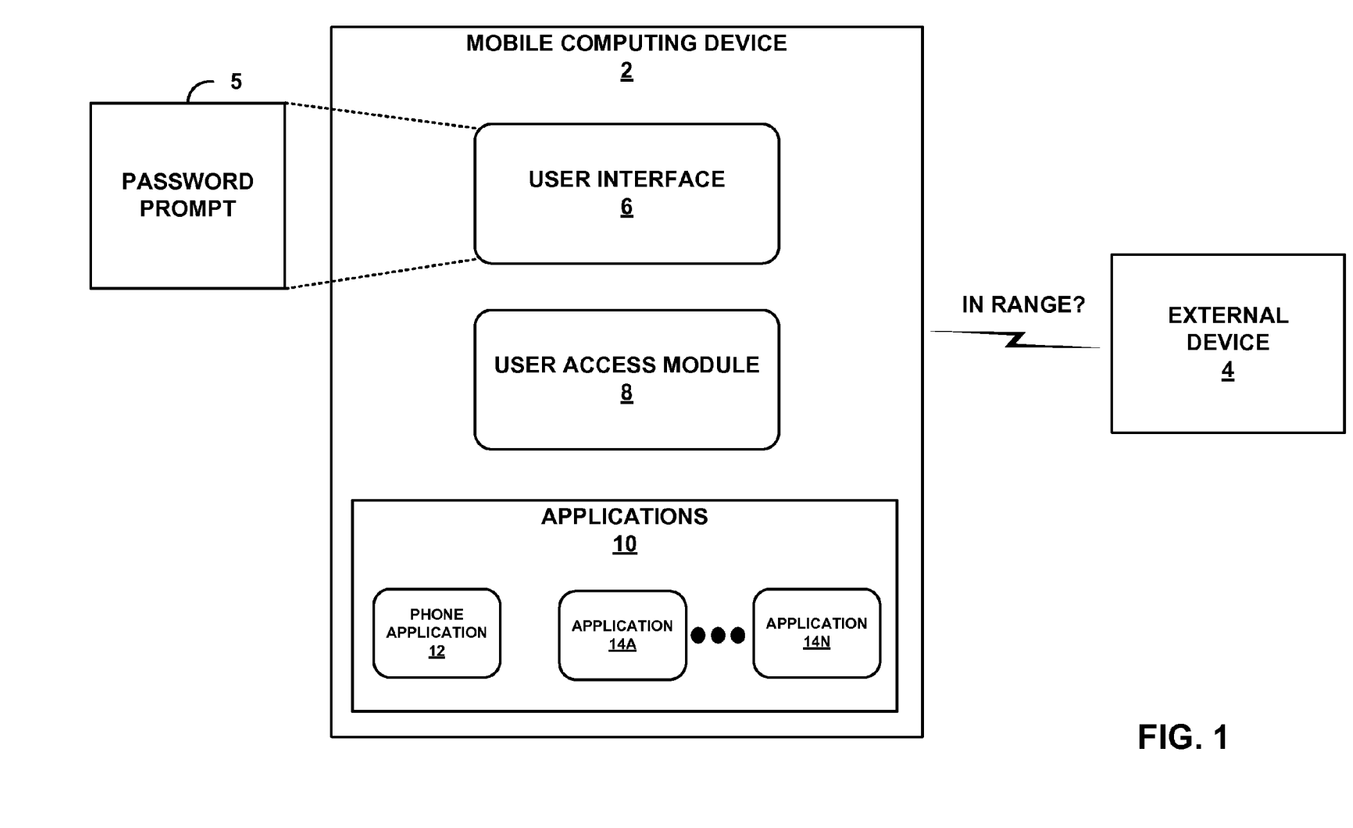
FIG. 1 is a block diagram illustrating an example of a mobile computing device that may be configured to perform one or more unlock operations responsive to detecting a presence of an external device, in accordance with one or more aspects of the present disclosure.

FIG. 1 is a block diagram illustrating an example of a mobile computing device 2 that may be configured to perform one or more unlock operations responsive to detecting a presence of an external device 4, in accordance with one or more aspects of the present disclosure. Mobile computing device 2 may, in some examples, comprise or be part of a wireless communication device (e.g., wireless mobile handset or device), a video telephone, a digital multimedia player, a personal digital assistant (PDA), a video game console, a laptop computer, or other mobile device.

Mobile computing device 2 is capable of wirelessly communicating with external device 4. As one non-limiting example, mobile computing device 2 and external device 4 may communicate via a Bluetooth® protocol. In general, mobile computing device 2 and external device 4 may communicate via any form of wireless communication mechanism or protocol. In some examples, a low-energy technology or protocol (e.g., Bluetooth® 4.0 technology) may be implemented to provide lower energy and/or power consumption targets, wherein external device 4 may be capable of operating with infrequent (e.g., months) between potential charges.

As will be described in further detail below, mobile computing device 2 may be capable of detecting a presence of external device 4 (e.g., if external device 4 is in range or in relative close proximity to mobile computing device 2), such as, for instance, analyzing a signal strength of a signal that is wirelessly transmitted by external device 4. In some examples, external device 4 may comprise a mobile device (e.g., fob). For instance, external device may comprise a small, mobile device that could be carried by a user (e.g., a device to fit in or on a user's hand, wallet, purse, pocket, keychain, or the like).

Mobile computing device 2 may be capable of executing one or more applications 10. As shown in the example of FIG. 1, applications 10 may include a phone application 12 and one or more other applications 14A-14N. Phone application 12 is executable to process phone calls using mobile computing device 2. For example, a user of mobile computing device 2 may use phone application 12, during execution, to receive an incoming phone call and/or to place an outgoing phone call. Phone application 12 may provide one or more call related features, including one or more of the following features: call waiting; caller identification; call holding; call transferring; forwarding; and conferencing. Various other call-related features may, in some cases, also be provided by phone application 12.

Applications 10 may include one or more other applications 14A-14N. Applications 14A-14N may be non-phone applications (e.g., not executable to process phone calls using mobile computing device 2, or to perform one or more tasks not related to processing phone calls using mobile computing device 2). Applications 14A-14N may include any number of applications that may be executed by mobile computing device 2, such as a digital multimedia player application, a video game application, a web browser application, an email application, a word processing application, a spreadsheet application, a document reader application, or other form of application. During execution of one or more of applications 10, mobile computing device 2 may access information or content. In some instances, this information or content may include content that contains private, confidential, or other sensitive data that the user of mobile computing device 2 may want to secure or protect.

As shown in FIG. 1, mobile computing device 2 also includes a user interface 6. User interface 6 provides an interface to mobile computing device 2 for a user. User interface 6 may include one or more input devices, such as one or more of a touch screen, a keyboard (physical and/or soft, graphical keyboard), trackpad, trackball, other pointing device (e.g., mouse), buttons, and microphone. User interface 6 may further include one or more output devices, such as one or more of speakers, lights, display (e.g., touchscreen), and vibration mechanism.

In the example of FIG. 1, user interface 6 may provide a display 5 (e.g., touchscreen display). A user may interact with user interface 6 to provide user input and to view output via display 5. For instance, in cases where display 5 comprises a touchscreen, a user may provide user input via the touchscreen, and may also view output information via the touchscreen. As will be described in further detail below, a user may enter a password via user interface 6.

Mobile computing device 2 further includes a user access module 8. As will be described in further detail below, user access module 8 may manage user access and access permissions to mobile computing device 2. At any particular point in time, mobile computing device 2 may become locked (e.g., after a period of inactivity or non-use of mobile computing device 2, or after the user has manually locked mobile computing device 2 via user interface 6). After becoming locked, user access module 8 may prohibit any user access to certain functionality of mobile computing device 2 if the device fails to wirelessly detect that external device 4 is present (e.g., in range, or in relative close proximity).

For instance, user access module 8 may prohibit any user access to applications 14A-14N of mobile computing device 2 if external device 4 is not in range. However, in some cases, even if external device is not in relative close proximity to mobile computing device 2, user access module 8 may still allow the user to receive phone calls and/or make certain types of phone calls (e.g., emergency or "911" calls) using phone application 12.

Once mobile computing device 2 has become locked, it may continue to determine whether external device 4 (which may comprise a mobile device) is present (e.g., in range) with respect to mobile computing device 2. For example, mobile computing device 2 may attempt to detect the presence of external device 4 based upon detection of wireless signals that are transmitted by external device 4. For instance, if the signal strength of a signal transmitted by external device 4 and received by mobile computing device 2 exceeds some defined threshold, mobile computing device 2 may determine that external device is present. Upon such determination, user access module 8 may perform a first unlock operation for accessing select functionality of the device (e.g., functionality that allows a user to make or receive any desired phone calls using phone application 12).

However, user access module 8 may not, in some cases, allow user access to other select functionality (e.g., functionality to access data stored on mobile computing device 2 during execution of one or more of applications 14A-14N) until a second unlock operation is performed. As one example, user access module 8 may perform the second unlock operation upon receiving user input specifying an access password. For instance, if user interface 6 of mobile computing device 2 provides a password prompt on a display 5, the user may enter an access password responsive to the prompt. The user may enter the password such as by typing in the password or providing another form of manual input. In some cases, the user may enter the password verbally (e.g., speaking into a microphone of mobile computing device 2). If mobile computing device 2 has detected the presence of external device 4, and if mobile computing device 2 has also received an access password from the user, user access module 8 may allow complete user access to both phone application 12 and one or more of applications 14A-14N.

In some cases, user access module 8 may permit complete user access to phone application 12 upon receiving user input specifying the access password. For example, user access module 8 may allow the user to make or receive phone calls using phone application 12 upon receipt of the access password, regardless of whether mobile computing device 2 has detected the presence of external device 4. However, even in these cases in which the user has successfully entered the access password, user access module 8 may not permit access to applications 14A-14N until mobile computing device 2 has detected the presence of external device 4.

Certain aspects of the disclosure may provide one or more benefits. For example, a mobile device may provide additional security for data content that is stored in the mobile device by providing an unlock mechanism that does not provide access to such content unless the mobile device is capable of wirelessly detecting the presence of a separate, external (e.g., mobile) device. Thus, if, for example, a first user loses or misplaces the first user's mobile device, which may include private or other sensitive information (e.g., email messages, photos, other sensitive data), and the mobile device is locked, a second user may not be able to unlock the mobile device or gain access to the sensitive information contained therein unless the second user also has access to a completely separate device that is external to the mobile device, and whose presence can be wirelessly detected by the mobile device.

For example, the first user may initially possess the mobile device and the external device. The external device may comprise a small device that is, for example, attached to the first user's keychain or carried by the first user. The mobile device may be able to wirelessly detect that the external device is in relative close proximity when both devices are in possession of the first user. The mobile device may also be configured to secure access to select data that is stored on the device, and to allow access to this data only if it detects the presence of the external device. In some cases, the mobile device may allow access to the data only it the first user further enters an access password.

If the first user loses the mobile device (or has the mobile device stolen), but maintains possession of the external device, a second user who obtains possession of the mobile device may be unable to access any content stored on the mobile device, because the mobile device is no longer able to wirelessly detect the presence of the external device. Regardless, then, of whether the second user is able to figure out or "hack" the access password of the mobile device, the mobile device may restrict any access to secure content until it is able to detect the presence of the external device, which is still in the possession of the first user. Thus, the content stored on the mobile device may be more secure, particularly when the mobile device is lost or stolen and is no longer in proximity to the external device.

Figure 2:
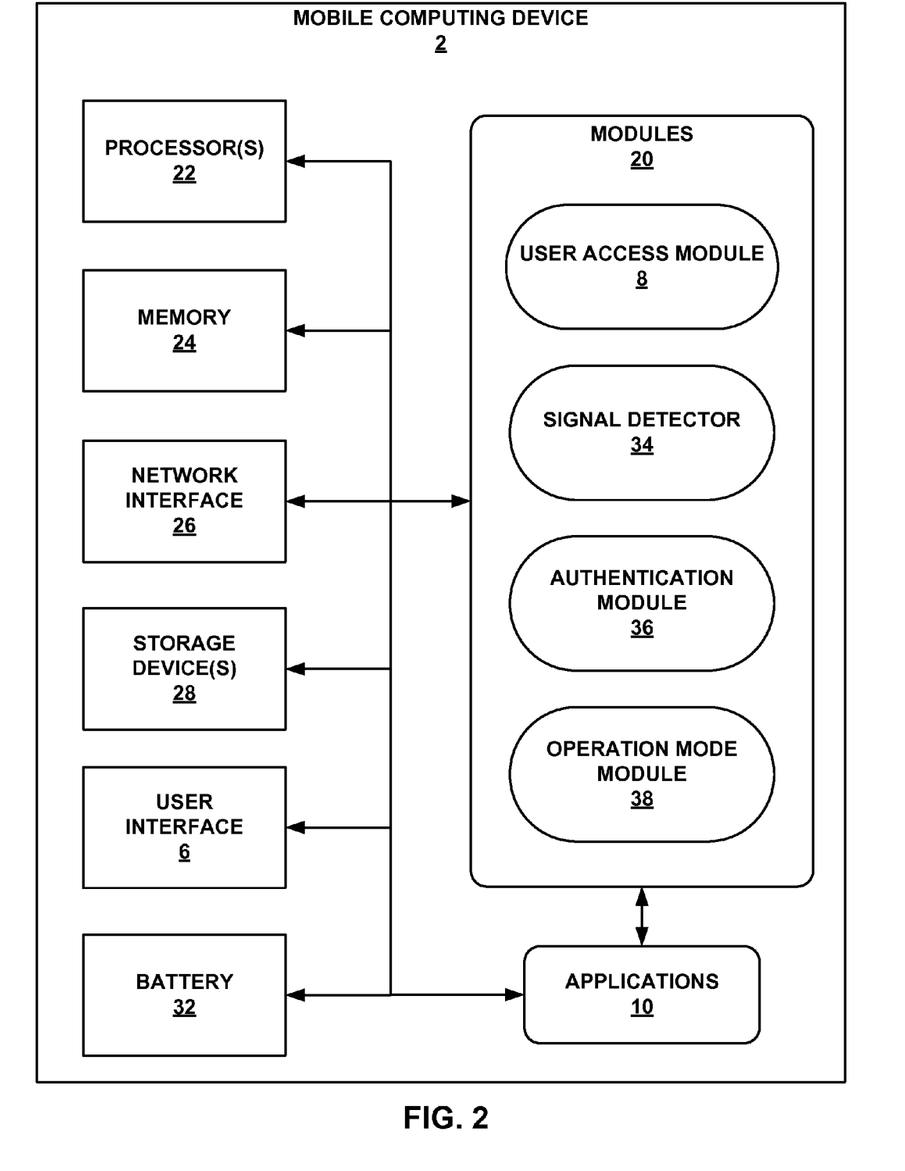
FIG. 2 is a block diagram illustrating further details of one example of the mobile computing device shown in FIG. 1.

FIG. 2 is a block diagram illustrating further details of one example of the mobile computing device 2 shown in FIG. 1. FIG. 2 illustrates only one particular example of mobile computing device 2, and many other example embodiments of mobile computing device 2 may be used in other instances.

As shown in the specific example of FIG. 2, computing device 2 includes one or more processors 22, memory 24, a network interface 26, one or more storage devices 28, user interface 6, and a battery 32. Each of components 22, 24, 26, 28, 6, and 32 may be interconnected via one or more busses for inter-component communications. Processors 22 may be configured to implement functionality and/or process instructions for execution within mobile computing device 2. Processors 22 may be capable of processing instructions stored in memory 24 or instructions stored on storage devices 28.

User interface 6 may include, for example, a monitor or other display device (e.g., display 5 shown in FIG. 1) for presentation of visual information to a user of mobile computing device 2. User interface 6 may further include one or more input devices to enable a user to input data, such as a keyboard, mouse, trackpad, microphone, etc. In some example, user interface 6 may comprise a touchscreen, which may be used both to receive and process user input and also to display output information. User interface 6 may further include printers or other devices to output information, including one or more speakers.

Memory 24 may be configured to store information within mobile computing device 2 during operation. Memory 24 may, in some examples, be described as a computer-readable storage medium. In some examples, memory 24 is a temporary memory, meaning that a primary purpose of memory 24 is not long-term storage. Memory 24 may also, in some examples, be described as a volatile memory, meaning that memory 24 does not maintain stored contents when the computer is turned off. Examples of volatile memories include random access memories (RAM), dynamic random access memories (DRAM), static random access memories (SRAM), and other forms of volatile memories known in the art. In some examples, memory 24 may be used to store program instructions for execution by processors 22. Memory 24 may be used by software or applications running on mobile computing device 2 (e.g., one or more of applications 10) to temporarily store information during program execution.

Storage devices 28 may also include one or more computer-readable storage media. Storage devices 28 may be configured to store larger amounts of information than memory 24. Storage devices 28 may further be configured for long-term storage of information. In some examples, storage devices 28 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Mobile computing device 2 also includes network interface 26. Mobile computing device 2 may utilize network interface 26 to communicate with external devices (e.g., external device 4) via one or more networks, such as one or more wireless networks. In some examples, network interface 26 may include a Bluetooth® network interface module. In these examples, mobile computing device 2 may utilize network interface 26 to wirelessly communicate with external device 4 via Bluetooth® communication.

Any applications implemented within or executed by mobile computing device 2 (e.g., applications 10) may be implemented or contained within, operable by, executed by, and/or be operatively coupled to processors 22, memory 24, network interface 26, storage devices 28, and/or user interface 6.

As shown in the example of FIG. 2, mobile computing device 2 may further include a collection of modules 20.

Modules 20 may be implemented or executed by mobile computing device 2 as software modules, hardware modules, firmware modules, or any combination thereof. For instance, in some examples, one or more of modules 20 may be stored in memory 24 and/or storage devices 28, and loaded for execution by processors 22. In some examples, one or more of modules 20 may be implemented directly by processors 22.

Figure 4A:
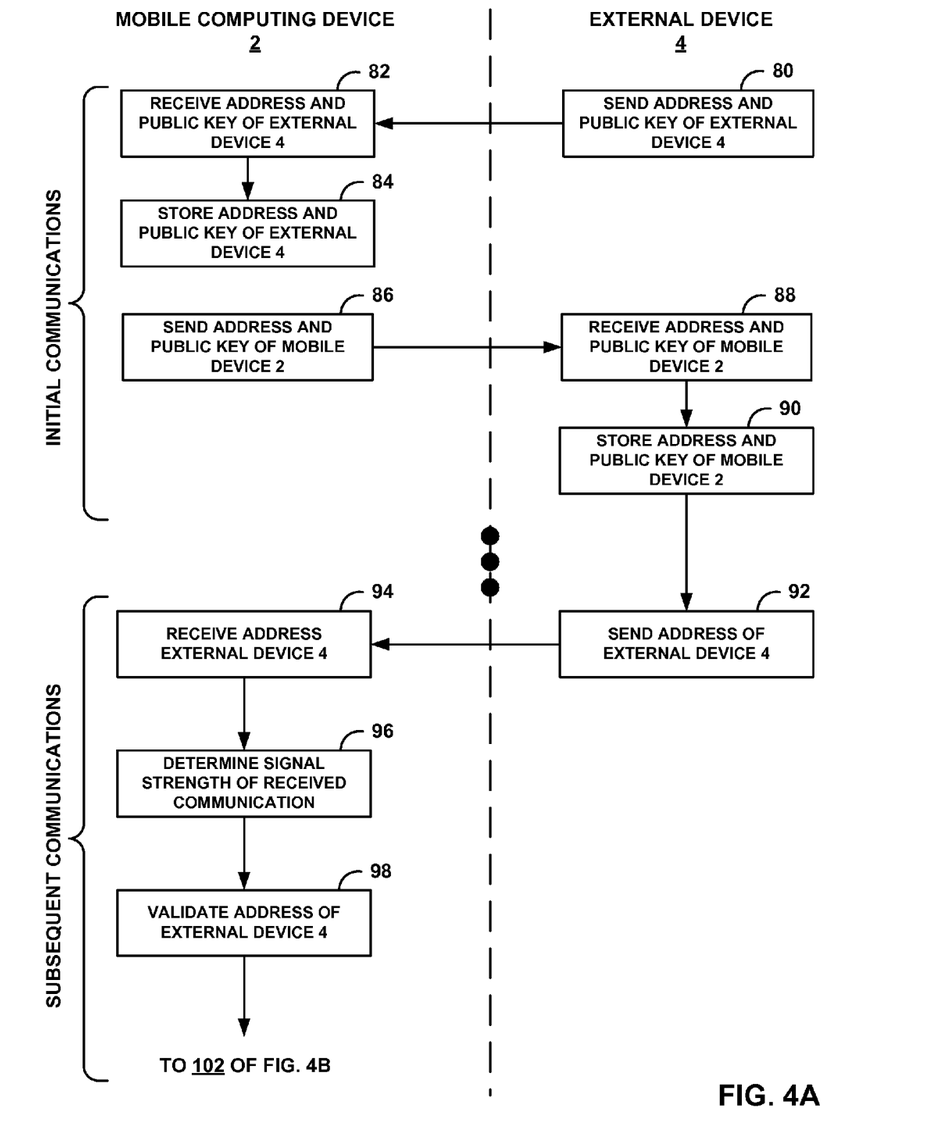
FIGS. 4A-4B illustrate an example interaction diagram for an interaction between the mobile computing device and external device of FIG. 1, in accordance with one or more aspects of the present disclosure.
Figure 4B:
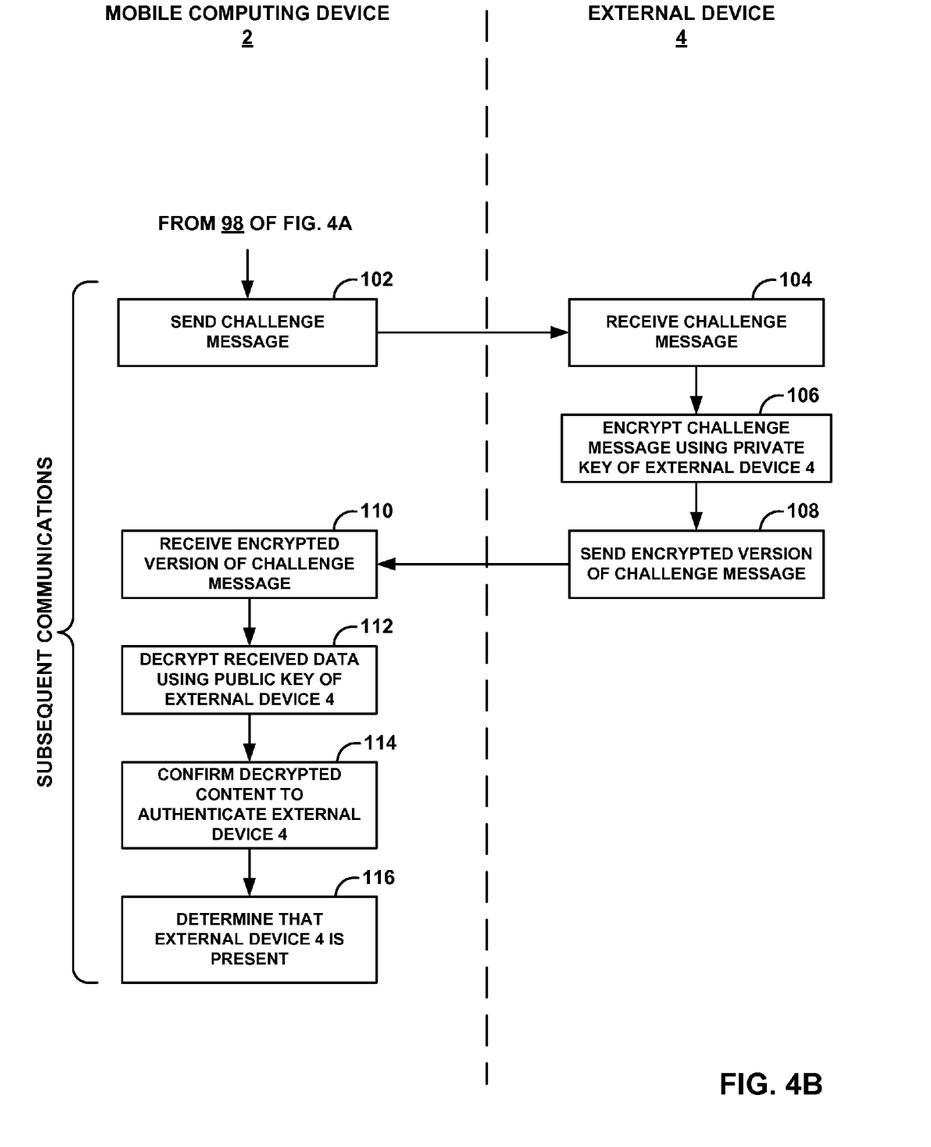

Modules 20, according to the example of FIG. 2, include user access module 8, a signal detector module 34, an authentication module 36, and an operation mode module 38. As described previously with reference to FIG. 1, user access module 8 is capable of managing user access to one or more of applications 10. Signal detector 34 is capable of detecting incoming signals received from external devices, such as external device 4. Authentication module 36 is capable of authenticating external devices, such as external device 4. Operation mode module 38 is capable of determining or managing operation modes of mobile computing device 2. In some examples, signal detector 34 and/or authentication module 36 may be coupled to or interact with network interface 26. FIGS. 4A-4B illustrate certain example functionality that may be performed by one or more of modules 20, such as signal detector 34 and/or authentication module 36, that may be operatively coupled to network interface 26. Modules 20 will be described in further detail below.

As discussed previously with respect to FIG. 1, applications 10 include phone application 12 as well as other applications 14A-14N, any of which may be operable by processors 22. Operation mode module 38 may be operable by processors 22 to initiate a first mode of operation when mobile computing device 2 becomes locked (e.g., after a period of inactivity or after a user has manually locked device 2). Once mobile computing device 2 is locked, user access module 8 may prohibit user access to one or more of applications 14A-14N during the first mode of operation if mobile computing device 2 fails to wirelessly detect a presence of external device 4. User access module 8 may further prohibit user access to any data that is to be used in conjunction or association with one or more of applications 14A-14N during the first mode of operation (e.g., email data, word processing data). During the first mode of operation, user access module 8 may, in some cases, completely prohibit any user access of application data that may be stored in memory 24 and/or storage devices 28.

User access module 8 may prohibit such access in an effort to prohibit any user access to sensitive data or other content associated with one or more of applications 14A-14N that is stored on mobile computing device 2 (e.g., within memory 24 and/or storage devices 28). For example, if application 14A is an email application, user access module 8 may not allow a user to access application 14A or any email data associated with application 14A (e.g., data that may be stored in memory 24 and/or storage devices 28) if mobile computing device 2 is unable to detect the presence of external device 4. Even if the user enters an access password via user interface 6 (e.g., in response to a password prompt of display 5 shown in FIG. 1), mobile computing device 2 may nevertheless prohibit the user from accessing application 14A or any content associated therewith on mobile computing device 2 if mobile computing device is unable to detect the presence of external device 4 (e.g., during the first mode of operation).

Operation mode module 38 is operable to initiate a second, different mode of operation when mobile computing device 2 wirelessly detects the presence of external device 4 and when mobile computing device 2 has received user input specifying an access password. Once both of these conditions are satisfied, user access module may, according to some examples, allow complete user access to both phone application 12 and to one or more of other applications 14A-14N during this second mode of operation. In these examples, user access module 8 may not allow any user access to one or more of applications 14A-14N unless mobile computing device (e.g., using signal detector 34) detects the presence of external device 4 and also has received a valid access password from the user. By doing so, user access module 8 may provide additional security to certain applications executed and/or associated content stored by mobile computing device 2.

For example, continuing with the email example above, if application 14A comprises an email application, a user would need, in this particular example, to both enter an access password (e.g., manually, verbally) via user interface 6 and also move external device 4 within range of mobile computing device 2 in order to utilize application 14A and access any content associated with application 14A that may be stored on mobile computing device 2. In such fashion, if mobile computing device 2 is lost or stolen, another user may not be able to use application 14A (or potentially any other of applications 14B-14N) unless external device 4 is in range of mobile computing device 2, even if this other user has somehow obtained the access password. The other user would only be able to use application 14A, and access any associated content stored on mobile computing device 2, if this user both enters the access password and also has access to external device 4.

User access module 8 is operable to perform a lock operation to prohibit user access to one or more of applications 14A-14N during the first mode of operation referenced above when mobile computing device 2 fails to wirelessly detect the presence of external device 4. User access module 8 is operable to perform a first unlock operation for both phone application 12 and one or more of applications 14A-14N when mobile computing device 2 wirelessly detects the presence of external device 4. User access module 8 is operable to perform a second unlock operation for both phone application 12 and one or more of applications 14A-14N when mobile computing device 2 has received user input specifying the access password. Thus, according to certain examples, user access module 8 may allow complete access to phone application 12 and one or more of applications 14A-14N upon performing both the first and second unlock operations.

As noted above, user access module 8 is operable to perform a first unlock operation for both phone application 12 and one or more of applications 14A-14N when mobile computing device 2 wirelessly detects the presence of external device 4. In some examples, mobile computing device 2 may determine that external device 4 is present only if it detects (e.g., using signal detector 34) that a received signal strength of a wireless communication from external device 4 is greater than a defined threshold, which may comprise a predetermined threshold or a user configurable threshold. For instance, based upon one or more user settings, mobile computing device 2 may determine the defined threshold. A user may specify the range in which mobile computing device 2 is to determine that external device 4 is present.

In some instances, a user may specify a configurable range or distance parameter, and mobile computing device 2 may calculate the defined signal strength threshold parameter based upon the user-specified range or distance parameter. For instance, mobile computing device 2 may calculate a lower signal strength threshold if the range or distance parameter is higher (e.g., indicating that mobile computing device 2 and external device 4 may be farther apart, according to the user-specified range or distance parameter), and may calculate a higher signal strength threshold if the range or distance parameter is lower. As such, a user may specify whether the user prefers that the external device 4 be closer or farther away in order for mobile computing device 2 to determine that external device 4 is present.

In some cases, mobile computing device 2 may determine that external device 4 is present only if it detects that the received signal strength from external device 4 is greater than the defined threshold for a defined continuous period of time, which may comprise a predetermined or a user configurable period of time. As one non-limiting example, if the defined period of time is three seconds, user access module 8 may be operable to perform a first unlock operation for both phone application 12 and one or more of applications 14A-14N only after mobile computing device 2 has detected the that the received signal strength of a wireless communication from external device 4 is greater than the defined threshold for at least three seconds.

In some instances, user access module 8 is operable by processors 22 to allow only partial user access to process phone calls using phone application 12 during the first mode of operation when mobile computing device 2 is locked. For example, during the first mode of operation, a user may, in some cases, receiving incoming calls and/or make selective outgoing calls (e.g., emergency, "911" calls) even if mobile device 2 is locked.

In some examples, phone application 12 may be executable to process phone calls by performing at least one of receiving incoming phone calls and making outgoing phone calls. Another one of applications 14A-14N may be executable to perform one or more tasks not related to receiving incoming phone calls or making outgoing phone calls. When mobile computing device 2 fails to wirelessly detect the presence of external device 4 and when mobile computing device 2 has not received user input specifying the access password, phone application 12 may, in some specific examples, be executable to receive incoming calls but not make any outgoing calls other than outgoing emergency (e.g., 911) calls.

In some examples, user access module 8 may allow complete (e.g., unrestricted) user access to process phone calls using phone application 12 during a third mode of operation. Operation mode module 38 is operable by processors 22 to initiate the third mode of operation when mobile computing device 2 has received user input specifying the access password, but has failed to wirelessly detect the presence of external device 4. Operation mode module 38 may also be operable by processors 22 to initiate the third mode of operation when mobile computing device 2 wirelessly detects the presence of external device 4, but has not received user input specifying the access password. Therefore, operation mode module 38 may initiate the third mode of operation responsive to mobile computing device 2 receiving the access password or detecting the presence of external device 4, but not both.

Mobile computing device 2 may utilize signal detector 34 when attempting to detect the presence of external device 4 (e.g., when external device 4 is in range or in relative close proximity to mobile computing device 2). As described above, signal detector 34 may be operable to wirelessly detect the presence of external device 4 responsive to identifying a wireless communication signal transmitted by external device 4. For example, signal detector 34 may be operable to determine that a signal strength of the wireless communication signal transmitted by external device 4 either exceeds or falls below a defined (e.g., predetermined) threshold. If the signal strength exceeds the defined threshold, signal detector 34 may determine that external device 4 is in range or in relative close proximity. If the signal strength falls below the defined threshold, signal detector 34 may determine that external device is not present.

In some cases, processors 22 may be configured to confirm an identity of external device 4 responsive to receiving an address of external device 4. For example, as shown in the example of FIGS. 4A-4B and described in further detail below, mobile computing device 2 and external device 4 may perform an initial data exchange (e.g., during a pairing process) in which external device 4 sends its address (e.g., unique Bluetooth® device address) to mobile computing device 2. Subsequently, signal detector 34 may receive a further communication from external device 4 and attempt to determine a signal strength of this communication. The communication sent from external device 4 may include address information associated with external device 4. Signal detector 34 and/or another module of mobile computing device 2 may confirm the identity of external device 4 by confirming that the address information aligns with the address previously received from external device 4 during the initial data exchange process.

Authentication module 36 may be operable by processors 22 to authenticate external device 4. For instance, as will be described in further detail in reference to FIGS. 4A-4B, authentication module may validating an encryption operation that is performed by external device 4 during the authentication process. After signal detector 34 has detected that external device 4 is present, mobile computing device 2 may utilize network interface 26 to send a message to external device 4. External device 4, as part of the communication mechanism or protocol with mobile computing device 2, may encrypt the received message using an encryption key (e.g., an asymmetric private key particular to external device 4), and send the encrypted message back to mobile computing device 2. Authentication module 36 may then authenticate external device 4 based upon the received encrypted message.

For instance, in some cases, authentication module 36 may authenticate external device 4 by comparing the received encrypted message with an encrypted version of the message that has been internally encrypted by authentication module 36 (e.g., when mobile computing device 2 and external device 4 may use the same encrypted key). In other cases, when asymmetric keys are utilized, authentication module 36 may have access to the public key of external device 4. For example, external device 4 may send its public key to mobile computing device 2 during the initial data exchange between these two devices. Upon receiving the encrypted message from external device 4 (which may have been encrypted by external device 4 using its private key), authentication module 36 may decrypt the encrypted message using the public key of external device 4, and compare the decrypted message with the one originally sent by mobile computing device 2 in order to authenticate external device 4.

Figure 3:
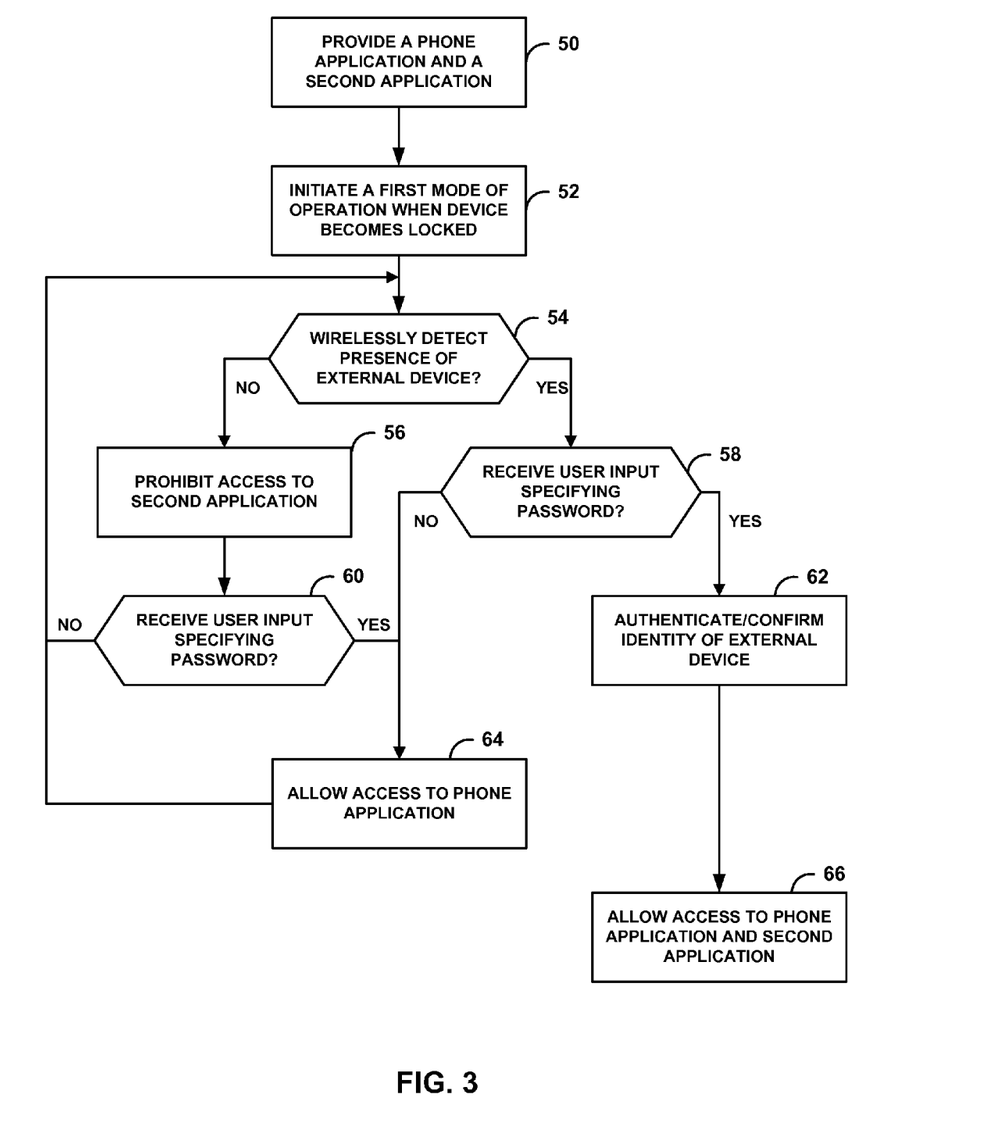
FIG. 3 is a flow diagram illustrating an example method that may be performed by a mobile computing device to perform one or more unlock operations, in accordance with one or more aspects of the present disclosure.

FIG. 3 is a flow diagram illustrating an example method that may be performed by a mobile computing device to perform one or more unlock operations, in accordance with one or more aspects of the present disclosure. For example, the method illustrated in FIG. 3 may be performed by mobile computing device 2 shown in FIGS. 1 and 2.

The method includes providing a phone application (e.g., phone application 12) and a second, different application (e.g., one of applications 14A-14N) on the mobile computing device, wherein the phone application is executable to process phone calls using the mobile computing device, and wherein the second application is executable to perform one or more tasks not related to processing phone calls using the mobile computing device (50). In some instances, the second application is executable to provide access to select content stored on the mobile computing device (e.g., personal/private data, sensitive data). A first mode of operation is initiated when the mobile computing device becomes locked (52).

The illustrated method includes determining whether or not the mobile computing device is able to wirelessly detect the presence of the external device, such as, for example, external device 4 (54). The mobile computing device may be able to wirelessly detect the presence of the external device responsive to identifying a wireless communication signal transmitted by the external device, as will be described further in reference to FIGS. 4A-4B. As one example, the mobile computing device may determine a signal strength of the wireless communication signal transmitted from the external device. If the signal strength exceeds a defined threshold, the mobile computing device may determine that the external device is present (e.g., in range or relative close proximity to the mobile computing device).

If mobile computing device is not able to wirelessly detect the presence of the external device ("NO" branch of 54), the method includes prohibiting user access to the second application during the first mode of operation (56). In certain situations, the method may also include automatically locking the mobile computing device when the mobile computing device fails to wirelessly detect the presence of the external device. The mobile computing device may further determine whether or not it has received user input specifying an access password (60).

If not ("NO" branch of 60), the mobile computing device may again determine whether or not it is able to wirelessly detect the presence of the external device (54). If it has received the access password, however ("YES" branch of 60), the method may include allowing complete (e.g., unrestricted) access to the phone application in an initiated third mode of operation (64). In some cases, the mobile computing device may allow partial user access to process phone calls using the phone application during the first mode of operation, even if it has not received the access password. For instance, it may allow a user to receive incoming calls and/or place select outgoing calls (e.g., emergency calls).

If the mobile computing device is able to wirelessly detect the presence of the external device ("YES" branch of 54), the mobile computing device may determine whether it has also received user input specifying an access password (58). If not ("NO" branch of 58), the mobile computing device may allow complete access to process phone calls using the phone application in a third mode of operation (64). If, however, it has received the access password ("YES" branch of 58), the method may include authenticating and/or confirming the identity of the external device (62). In various examples, the mobile computing device may determine that it has received the access password only if it has received a valid password within a defined amount of time either before or after wirelessly detecting the presence of the external device. For instance, the mobile computing device may determine that it has received the access password if it has received a valid password from the user within one minute, or some other define amount of time, of its detection of the external device.

In some examples, the phone application may be executable to process phone calls by performing at least one of receiving incoming phone calls and making outgoing phone calls. The second application may be executable to perform one or more tasks not related to receiving incoming phone calls or making outgoing phone calls. When the mobile computing device fails to wirelessly detect the presence of the external device and when the mobile computing device has not received user input specifying the access password, the phone application may, in some specific examples, be executable to receive incoming calls but not make any outgoing calls other than outgoing emergency (e.g., 911) calls.

As described previously, and as will be described in further detail in reference to FIGS. 4A-4B, the mobile computing device may confirm the identity of the external device and/or authenticate the external device. For example, the mobile computing device may confirm an identity of the external device responsive to receiving an address of the external device, such as a Bluetooth® device address, as will be described in more detail below in reference to FIGS. 4A-4B. As will also be further described below in reference to these figures, the mobile computing device may validate an encryption operation that is performed by the external device during the process of authenticating the external device. Upon authenticating and/or confirming the identify of the external device, the method of FIG. 3 includes initiating a second mode of operation, where the mobile computing device allows complete user access to both the phone application and the second application (66).

According to certain examples, the method illustrated in FIG. 3 may include performing a first unlock operation for both the phone application and the second application when the mobile computing device wirelessly detects the presence of the external device. The method may further include performing a second unlock operation for both the phone application and the second application when the mobile computing device has received user input specifying the access password. Responsive to performing both the first and second unlock operations, the mobile computing device may allow complete access to both the phone application and the other, second application.

FIGS. 4A-4B illustrate an example interaction diagram of an interaction between mobile computing device 2 and external device 4 of FIG. 1, in accordance with one or more aspects of the present disclosure. FIGS. 4A-4B illustrates only one example interaction between these two devices, and is provided for purposes of illustration only. In some examples, the various acts shown in FIGS. 4A-4B that are performed by mobile computing device 2 may be implemented by one or more modules, such as, for example, signal detector 34 and/or authentication module 36 shown in FIG. 2, which may be operatively coupled to a network interface, such as network interface 26.

During an initial communication phase between mobile computing device 2 and external device 4 (e.g., during a Bluetooth® pairing phase), external device 4 may send its address and public key to mobile computing device 2 via a wireless communication protocol (80). The address of external device 4 may, for instance, comprise an address such as a Media Access Control (MAC) address or a Bluetooth® device address. The public key of external device 4 may correspond to one key of a private-public key (e.g., asymmetric) key pair. External device 4 may share its public key with any other of external entities, such as mobile computing device 2, but may keep its private key internal and private.

Mobile computing device 2 may receive the address and public key that are sent by external device 4 via the wireless communication protocol (82), and may utilize its network interface 26 (FIG. 2) to process data communications with external device 4. Mobile computing device 2 is capable of storing the address and public key of external device 4 (84), such as in memory 24 and/or storage devices 28. Mobile computing device 2 may also send its own address and public key to external device 4 (86). External device 4 may receive (88) and store (90) such received information. Though mobile computing device 2 is shown as sending its address and public key information to external device 4 after external device 4 sends its address and public key information to mobile computing device 2 in the example of FIG. 4A, the disclosure is not so limited. Mobile computing device 2 is capable of sending such information to external device 4 either before or in parallel with external device 4 sending its information to mobile computing device 2.

At one or more subsequent points in time (e.g., during link level communications), mobile computing device 2 may determine whether external device 4 is present (e.g., in range or in relative close proximity to mobile computing device 2) based upon data communications from external device 4, which may or may not be successfully processed by mobile computing device 2. As shown in FIG. 4A, external device 4 may send its address to mobile computing device 2 (92). If mobile computing device 2 does not receive this data communication at all, it may determine that external device 4 is not present.

If mobile computing device 2 receives the address of external device 4 (94), it may determine the signal strength of the received communication (96). For instance, mobile computing device 2 may analyze the received communication and calculate a received signal strength indicator, and compare the indictor to a defined threshold value. The defined threshold value may comprise a predetermined value in some cases. In some instances, the defined threshold may comprise a configurable or user programmable value.

For example, the user of mobile computing device 2 may provide input specifying a detection range associated with a distance between mobile computing device 2 and external device 4. A higher value of the detection range parameter may result in a lower value of the defined threshold value to which the received signal strength indictor is compared, while a lower value of the detection range parameter may result in a higher value of the defined threshold value. For instance, if the user specifies a detection range parameter of 40 feet, mobile computing device 2 may detect that external device 4 is in range if the received signal strength indicator associated with a communication received from external device 4 exceeds a lower threshold value. However, if the user specifies a detection range parameter of only 10 feet, mobile computing device 2 may not detect that external device 4 is in range unless the received signal strength indicator exceeds a higher threshold value.

Mobile computing device 2 may also validate the address of external device 4 based upon the address received in the subsequent communication from external device 4 (98). For example, mobile computing device 2 may validate the received address by comparing it to the address previously received from external device 4 and stored by mobile computing device 2 during the initial communication phase.

Responsive to validating the address, mobile computing device 2 may send a "challenge" message to external device 4 to authenticate external device 4 (102). The "challenge" message may include a random number comprising a defined number of bits, in some examples. External device 4 may receive the "challenge" message (104) and encrypt the message using its private key and a defined encryption algorithm (106). External device 4 may then send an encrypted version of the "challenge" message back to mobile computing device 2 (108). In some cases, the encrypted version of the "challenge" message may include only a subset of the bits of the "challenge" message.

Mobile computing device 2 may received the encrypted version of the "challenge" message from external device 4 (110) and decrypt this message using the public key of external device 4 using a defined decryption algorithm (112). Mobile computing device 2 may authenticate external device 4 upon confirming the decrypted content (114). For instance, mobile computing device 2 may authenticate external device 4 upon determining that the decrypted version of the "challenge" message matches the originally sent "challenge" message, or at least matches a defined subset of bits of the original "challenge" message.

Responsive to authenticating external device 4, mobile computing device 2 may determine that external device 4 is present (116), and proceed with one or more of the unlock techniques described herein upon determining that external device 4 is present. For instance, responsive to determining that external device 4 is present and also receiving user input specifying an access password to mobile computing device 2, mobile computing device 2 may allow full user access to applications 10 (FIG. 1), including phone application 12 and one or more of applications 14A-14N.

In other examples, other forms of authentication may be utilized. As one example, mobile computing device 2 and external device 4 may utilize a common, symmetric encryption key that is used to both encrypt and decrypt content. This common key may preconfigured or determined on each of mobile computing device and external device 4 and be maintained as a private key. Responsive to mobile computing device 2 sending the "challenge" message to external device 4, each of mobile computing device 2 and external device 4 may encrypt the "challenge" message using the common key, which may, in some cases, include only a subset of bits of the "challenge" message. In some cases, the address (e.g., Bluetooth ® device address) of external device 4 may be used, along with the "challenge" message, as input to the encryption process using the common key. External device 4 may send a version of the encrypted "challenge" message back to mobile computing device 2, and mobile computing device 2 may attempt to authenticate external device 4 based upon a comparison of the received encrypted "challenge" message and its own internally encrypted version of the "challenge" message.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various aspects of the disclosure have been described. These and other aspects are within the scope of the following claims.

The invention claimed is:

1. A tangible computer-readable storage medium comprising instructions that, when executed, cause one or more processors of a mobile computing device to:
provide a phone application and a second, different application on the mobile computing device, wherein the phone application is executable to process phone calls using the mobile computing device, and wherein the second application is executable to perform one or more tasks not related to processing phone calls using the mobile computing device;
initiate a first mode of operation when the mobile computing device becomes locked;
prohibit user access to the second application during the first mode of operation when the mobile computing device fails to wirelessly detect a presence of an external device and has not received user input specifying an access password;
allowing partial user access to the phone application during the first mode of operation when the mobile computing device fails to wirelessly detect the presence of the external device and has not received user input specifying the access password, including allowing at least one of making an outgoing call using only one or more pre-determined numbers and receiving an incoming phone call using the phone application;
initiate a second mode of operation when the mobile computing device both wirelessly detects the presence of the external device and has received user input specifying the access password, wherein the mobile computing device allows complete user access to both the phone application and the second application during the second mode of operation; and
initiate a third mode of operation either when the mobile computing device has received user input specifying the access password and fails to wirelessly detect the presence of the external device, or when the mobile computing device wirelessly detects the presence of the external device and has not received user input specifying the access password,
wherein the mobile computing device during the third mode of operation allows complete user access to process phone calls using the phone application and prohibits user access to the second application.

2. The tangible computer-readable storage medium of claim 1, wherein the second application is executable to provide access to select content stored on the mobile computing device.

3. The tangible computer-readable storage medium of claim 1, wherein the instructions that cause the one or more processors of the mobile computing device to initiate the second mode of operation comprise instructions that cause the one or more processors of the mobile computing device to:
perform a first unlock operation for both the phone application and the second application when the mobile computing device wirelessly detects the presence of the external device; and
perform a second unlock operation for both the phone application and the second application when the mobile computing device has received user input specifying the access password.

4. The tangible computer-readable storage medium of claim 1, wherein the phone application is executable to process phone calls by performing at least one of receiving incoming phone calls and making outgoing phone calls, and wherein the second application is executable to perform one or more tasks not related to receiving incoming phone calls or making outgoing phone calls.

5. The tangible computer-readable storage medium of claim 1, further comprising instructions that cause the one or more processors of the mobile computing device to:
when the mobile computing device fails to wirelessly detect the presence of the external device and when the mobile computing device has not received user input specifying the access password, the phone application is executable to receive incoming calls but not make any outgoing calls other than outgoing emergency calls.

6. The tangible computer-readable storage medium of claim 1, further comprising instructions that cause the one or more processors of the mobile computing device to:
wirelessly detect the presence of the external device responsive to identifying a wireless communication signal transmitted by the external device.

7. The tangible computer-readable storage medium of claim 6, wherein the instructions that cause the one or more processors of the mobile computing device to wirelessly detect the presence of the external device comprise instructions that cause the one or more processors of the mobile computing device to:
determine that a signal strength of the wireless communication signal exceeds a defined threshold.

8. The tangible computer-readable storage medium of claim 6, wherein the instructions that cause the one or more processors of the mobile computing device to wirelessly detect the presence of the external device further comprise instructions that cause the one or more processors of the mobile computing device to:
confirm an identity of the external device responsive to receiving an address of the external device; and
authenticate the external device.

9. The tangible computer-readable storage medium of claim 8, wherein the instructions that cause the one or more processors of the mobile computing device to authenticate the external device comprise instructions that cause the one or more processors of the mobile computing device to:
validate an encryption operation that is performed by the external device.

10. The tangible computer-readable storage medium of claim 1, further comprising instructions that cause the one or more processors of the mobile computing device to:
lock the mobile computing device when the mobile computing device fails to wirelessly detect the presence of the external device.

11. A method comprising:
providing, by a mobile computing device, a phone application and a second, different application, wherein the phone application is executable to process phone calls using the mobile computing device, and wherein the second application is executable to perform one or more tasks not related to processing phone calls using the mobile computing device;
initiating, by the mobile computing device, a first mode of operation when the mobile computing device becomes locked;
prohibiting, by the mobile computing device, user access to the second application during the first mode of operation when the mobile computing device fails to wirelessly detect a presence of an external device and has not received user input specifying an access password;
allowing partial user access to the phone application during the first mode of operation when the mobile computing device fails to wirelessly detect the presence of the external device and has not received user input specifying the access password, including allowing at least one of making an outgoing call using only one or more pre-determined numbers and receiving an incoming phone call using the phone application;
initiating, by the mobile computing device, a second mode of operation when the mobile computing device wirelessly detects the presence of the external device and has received user input specifying the access password, wherein the mobile computing device allows complete user access to both the phone application and the second application during the second mode of operation; and
initiating a third mode of operation either when the mobile computing device has received user input specifying the access password and fails to wirelessly detect the presence of the external device, or when the mobile computing device wirelessly detects the presence of the external device and has not received user input specifying the access password,
wherein the mobile computing device during the third mode of operation allows complete user access to process phone calls using the phone application and prohibits user access to the second application.

12. A mobile computing device comprising:
one or more processors;
a phone application operable by the one or more processors to process phone calls using the mobile computing device;
a second, different application operable by the one or more processors to perform one or more tasks not related to processing phone calls using the mobile computing device; and
an operation mode module operable by the one or more processors to initiate a first mode of operation when the mobile computing device becomes locked;
wherein the mobile computing device prohibits user access to the second application during the first mode of operation when the mobile computing device fails to wirelessly detect a presence of an external device and has not received user input specifying an access password,
wherein the mobile computing device allows partial user access to the phone application during the first mode of operation when the mobile computing device fails to wirelessly detect the presence of the external device and has not received user input specifying the access password, including allowing at least one of making an outgoing call using only one or more pre-determined numbers and receiving an incoming phone call using the phone application,
wherein the operation mode module is operable to initiate a second mode of operation when the mobile computing device both wirelessly detects the presence of the external device and has received user input specifying the access password,
wherein the mobile computing device allows complete user access to both the phone application and the second application during the second mode of operation,
wherein the operations module is further operable to initiate a third mode of operation either when the mobile computing device has received user input specifying the access password and fails to wirelessly detect the presence of the external device, or when the mobile computing device wirelessly detects the presence of the external device and has not received user input specifying the access password, and
wherein the mobile computing device during the third mode of operation allows complete user access to process phone calls using the phone application and prohibits user access to the second application.

13. The mobile computing device of claim 12, wherein the second application is operable to provide access to select content stored on the mobile computing device.

14. The mobile computing device of claim 12, wherein:
the user access module is operable to perform a lock operation to prohibit user access to the second application during the first mode of operation when the mobile computing device fails to wirelessly detect a presence of an external device;
the user access module is operable to perform a first unlock operation for both the phone application and the second application when the mobile computing device wirelessly detects the presence of the external device; and
the user access module is operable to perform a second unlock operation for both the phone application and the second application when the mobile computing device has received user input specifying the access password.

15. The mobile computing device of claim 12, wherein the phone application is executable to process phone calls by performing at least one of receiving incoming phone calls and making outgoing phone calls, and wherein the second application is executable to perform one or more tasks not related to receiving incoming phone calls or making outgoing phone calls.

16. The mobile computing device of claim 12, wherein when the mobile computing device fails to wirelessly detect the presence of the external device and when the mobile computing device has not received user input specifying the access password, the phone application is executable to receive incoming calls but not make any outgoing calls other than outgoing emergency calls.

17. The mobile computing device of claim 12, further comprising a signal detector operable to wirelessly detect the presence of the external device responsive to identifying a wireless communication signal transmitted by the external device.

18. The mobile computing device of claim 17, wherein the signal detector is operable to determine that a signal strength of the wireless communication signal exceeds a defined threshold.

19. The mobile computing device of claim 17, wherein the one or more processors are configured to confirm an identity of the external device responsive to receiving an address of the external device.

20. The mobile computing device of claim 17, further comprising an authentication module that is operable by the one or more processors to authenticate the external device at least by validating an encryption operation that is performed by the external device.

* * * * *